US010595453B2

(12) United States Patent
Woelfle et al.

(10) Patent No.: US 10,595,453 B2
(45) Date of Patent: Mar. 24, 2020

(54) TRACTOR HAVING A RETRACTABLE CABLE LIFTING BLOCK

(71) Applicant: AGCO International GmbH, Neuhausen (CH)

(72) Inventors: Gottlieb Woelfle, Marktoberdorf (DE); Thomas Magg, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 48 days.

(21) Appl. No.: 15/958,482

(22) Filed: Apr. 20, 2018

(65) Prior Publication Data

US 2018/0317369 A1 Nov. 8, 2018

(30) Foreign Application Priority Data

May 4, 2017 (GB) .................................. 1707092.1

(51) Int. Cl.
*A01B 63/111* (2006.01)
*A01B 59/06* (2006.01)
*A01B 59/043* (2006.01)
*B60D 1/14* (2006.01)
*B60D 1/18* (2006.01)
*B60D 1/46* (2006.01)
*B60D 1/58* (2006.01)
*A01B 59/00* (2006.01)
*A01B 63/112* (2006.01)

(52) U.S. Cl.
CPC .......... *A01B 59/066* (2013.01); *A01B 59/043* (2013.01); *B60D 1/141* (2013.01); *B60D 1/185* (2013.01); *B60D 1/46* (2013.01); *B60D 1/58* (2013.01); *A01B 59/002* (2013.01); *A01B 63/111* (2013.01); *A01B 63/112* (2013.01)

(58) Field of Classification Search
CPC ... A01B 59/002; A01B 59/004; A01B 59/066; A01B 63/111; B60D 1/141; B60D 1/185; B60D 1/46
USPC .......................................... 172/439, 448, 449
See application file for complete search history.

(56) References Cited

U.S. PATENT DOCUMENTS 2,826,432 A * 3/1958 Clever ..................... B60D 1/26
280/477
3,774,943 A * 11/1973 Schmiesing ............. B60D 1/40
172/677
3,923,175 A * 12/1975 Landvatter ................ B60P 1/36
414/489

(Continued)

FOREIGN PATENT DOCUMENTS

DE 10 2015 103 925 A1 * 12/2015

OTHER PUBLICATIONS

UK Intellectual Property Office, International Search report for priority Application No. GB1707092.1, dated Oct. 31, 2017.

(Continued)

*Primary Examiner* — Gary S Hartmann

(57) ABSTRACT

An agricultural tractor having a three-point hitch with a top link. The tractor is provided with a lifting block adjacent the three-point hitch. The lifting block has a retractable cable which can be used to assist in the raising or lowering of the top link, to allow for easy manipulation of the top link by an operator. In addition, the cable of the lifting block can be used to assist in the coupling of a rear attachment system of the tractor with relatively heavy implements.

14 Claims, 5 Drawing Sheets

(56) References Cited

U.S. PATENT DOCUMENTS

| | | | | |
|---|---|---|---|---|
| 4,018,451 | A | 4/1977 | Walterscheild | |
| 6,257,347 | B1 * | 7/2001 | Campisi | A01B 59/068 |
| | | | | 172/439 |
| 6,334,269 | B1 * | 1/2002 | Dilks | E01H 5/06 |
| | | | | 172/63 |
| 6,663,338 | B1 * | 12/2003 | Gregory, Jr. | A01B 59/067 |
| | | | | 37/403 |
| 6,964,121 | B2 * | 11/2005 | Harris | E02F 3/7627 |
| | | | | 172/439 |
| 2005/0206126 | A1 * | 9/2005 | Harris | E02F 3/7627 |
| | | | | 280/479.1 |
| 2010/0038882 | A1 | 2/2010 | Chimento et al. | |

OTHER PUBLICATIONS

European Patent Office, Search Report for related EP Application No. 18 16 8413, dated Oct. 1, 2018.

\* cited by examiner

TRACTOR HAVING A RETRACTABLE CABLE LIFTING BLOCK

BACKGROUND

Field of the Invention

The present invention relates to an agricultural tractor having systems for connection with mounted or towed implement, in particular relatively large tractors, having relatively large connection systems.

Description of Related Art

Driven by the desire for increased economies of scale, agricultural tractors are tending towards steadily increasing power capacity, allowing for a single tractor to perform operations on a larger scale than previously considered. For example, the Vario 1000 series provided by Fendt® is available is various power ratings between 380 HP-500 HP. Such increased tractor dimensions can present unforeseen problems to a tractor operator.

Agricultural tractors are regularly provided with three-point hitches for the attachment of mounted implements to the tractor, the hitches comprising powered lower lift arms, and an unpowered top link arm to provide a three-point connection for implements. As tractor size increases, accordingly the size of such three-point hitches also increases, allowing for the attachment of larger implements. However, the increased dimensions of the three-point hitch results in relatively heavy and unwieldly components, which can be difficult for an operate to manoeuver into place, in particular the unpowered top link.

In addition, tractors are regularly coupled with trailers or towed implements such as cultivator devices, applicator machines, etc., which can be coupled with a rear attachment system of a tractor such as a drawbar, a hitch hook or a ball hitch. As the power capacity of some tractors increases, accordingly the ability of such tractors to pull implements or larger size or draft forces also increases, thereby allowing for a greater range of agricultural operations to be performed using a single tractor.

However, the increasing size of such implements can present challenges to a tractor operator, as the simple action of coupling such an implement to the tractor may be rendered impossible for a single operator to perform without additional assistance, due to the increased implement weight. Operators will often use specialist hoists to raise heavy machinery for coupling with a rear attachment system of a tractor, but such a facility requires the provision of such relatively bulky equipment, and limits the flexibility of the operator to decouple implements from the tractor, e.g. when the tractor is out in the field.

It is an object of the invention to provide an agricultural tractor which addresses the above issue.

SUMMARY OF THE INVENTION

Accordingly, there is provided an agricultural tractor having a three-point hitch comprising a top link, the tractor further comprising a lifting block provided adjacent the three-point hitch to allow the top link to be raised or lowered relative to the rear attachment system, the lifting block comprising:

a retractable cable to be selectively attached to the top link, and at least one actuator to control retraction of the cable to allow for raising or lowering of the top link.

Providing a lifting block adjacent the three-point hitch results in a relatively simple system for the efficient raising and lowering of the top link of a three-point hitch. This provides significant advantages on relatively large tractors, where the top link weight today can easily be of the order of approximately 30-50 kgs. Preferably, the invention is for use on tractors having top links with a weight of at least 20-25 kgs. It will be understood that the entire weight of the top link may be carried by the cable of the lifting block, or the system can be configured to provide a lifting force equivalent to the majority of the weight of the top link, thereby allowing for relatively easy manipulation of the top link by an operator. It will be understood that the cable as described above may be provided as any suitable chord, rope, chain, or wire, etc.

In a further aspect, the lifting block can be configured to retain the top link in a raised storage position, when not in use.

Additionally, the tractor may comprise a rear attachment system such as a drawbar, a hitch hook or a ball hitch, the rear attachment system for connection with a coupling portion of an implement to be attached to the tractor, wherein the retractable cable of the lifting block can be selectively attached to such an implement coupling portion, to allow for the raising or lowering of the implement coupling portion relative to the rear attachment system of the tractor.

By providing a lifting block at the rear of the tractor to allow for raising/lowering of an implement coupling portion, as a result the lifting block can aid in the raising or lowering of implements relative to the rear attachment system of the tractor, to facilitate connection of the implement coupling portion with the rear attachment system. This reduces the operator effort required when connecting heavy implements with the rear attachment system, as at least a substantial portion of the effort in lifting the implement coupling portion can be borne by the lifting block. The implement to be attached to the tractor can be understood to be any suitable towed or trailed implement or trailer device.

Preferably, the lifting block comprises:

at least two pulleys, a portion of the cable running between the at least two pulleys; and at least one actuator arranged to adjust a distance between said pulleys, to control the length that the cable can extend outside the pulleys.

By varying the distance between the pulleys, a greater portion of the cable is held taut between the pulleys, leaving less slack along the cable and accordingly less cable length which can drawn outside of the pulleys and the lifting block.

Preferably, at least one of the pulleys comprises a winding pulley or a winding sheave.

By providing at least one winding pulley or winding sheave, the cable can be coiled around the pulley or sheave for storage. In addition, as the cable can be wound about one or more of the pulleys in the lifting block, accordingly a relatively small variation in distance between two pulleys can translate into a relatively large difference in cable length which can be drawn or extended outside of the pulleys.

Preferably, the lifting block comprises a housing, wherein the pulleys are provided within the housing, and wherein the at least one actuator is arranged to adjust a distance between said pulleys to control the length that the cable can extend outside the housing.

Preferably, the lifting block comprises:

a first pulley mounted on said housing; and a second pulley mounted on an adjustment arm located in the housing, wherein a first end of the adjustment arm is pivotably mounted on said housing, so that an opposite second end of the adjustment arm is moveable through an arc as the arm is pivoted, the second pulley located towards the second end of the adjustment arm.

The first end of the arm is connected to a pivot point, which allows for the arm to be pivoted about the pivot point. Providing a pivoting adjustment arm allows for the distance between the first and second pulleys to be varied using a relatively simple and robust system.

Preferably, the housing comprises a pair of opposed mounting plates arranged either side of the adjustment arm.

Preferably, the lifting block is secured to the tractor by mounting either of the opposed mounting plates to a portion of the tractor.

The lifting block can be configured to be attached at different points on the tractor, and at different sides or faces of the lifting block. Such a construction allows for greater flexibility of use, as the lifting block can be moved to different locations depending on requirements, or different tractor constructions. It will be understood that the lifting block may be provided with other suitable mounting connections for attachment to a tractor, or the lifting block may be provided as an integral component of the tractor itself.

Preferably, bolt holes are provided on the mounting plates to secure either of the mounting plates to the tractor.

Preferably, the at least one actuator is coupled with the adjustment arm, to control the pivoting of the adjustment arm about a pivot point.

Preferably, the at least one actuator comprises a first end connected to the lifting block housing and a second end connected to the adjustment arm.

It will be understood that the first end and/or the second end of the at least one actuator can be adjustably mounted to the lifting block housing or the adjustment arm respectively, to allow for different ranges of movement of the actuator.

In a preferred embodiment, the at least one actuator comprises a spring-return actuator.

Preferably, the spring-return actuator is arranged to bias the cable to a retracted state wherein the cable is substantially retained within the lifting block housing.

Additionally or alternatively, the at least one actuator may comprise at least one of the following: a pneumatic actuator, a hydraulic actuator, an electromechanical actuator.

It will be understood that the at least one actuator may be coupled with a suitable pneumatic, hydraulic or electrical circuit of the tractor, for operation of the lifting block.

Preferably, the cable comprises a first end for attachment to the top link, and a second end fixed within the lifting block.

The second end of the cable may be provided with a connector arranged to couple with a complimentary connector provided on the top link. Similarly, a complementary connector may be provided on the coupling portion of an implement to be attached to the tractor, wherein the connector at the second end of the cable is arranged to couple with such an implement connector. Alternatively, the second end of the cable may be arranged to be looped around a portion of the top link, or around the coupling portion of an implement, to allow for the raising or lowering of the link or implement by the cable.

Preferably, the tractor comprises operator controls located at or near the lifting block, to control the operation of the at least one actuator. The lifting block may be controlled using an electronic control unit (ECU) of the tractor.

There is also provided a lifting block as described above, for installation on an agricultural tractor.

The lifting block may be provided as a kit of parts for installation on or retrofitting to an existing tractor.

BRIEF DESCRIPTION OF THE DRAWINGS

An embodiment of the invention will now be described, by way of example only, with reference to the accompanying drawings, in which.

The drawings are provided by way of reference only, and will be acknowledged as not to scale.

DETAILED DESCRIPTION OF THE INVENTION

Figure 1:
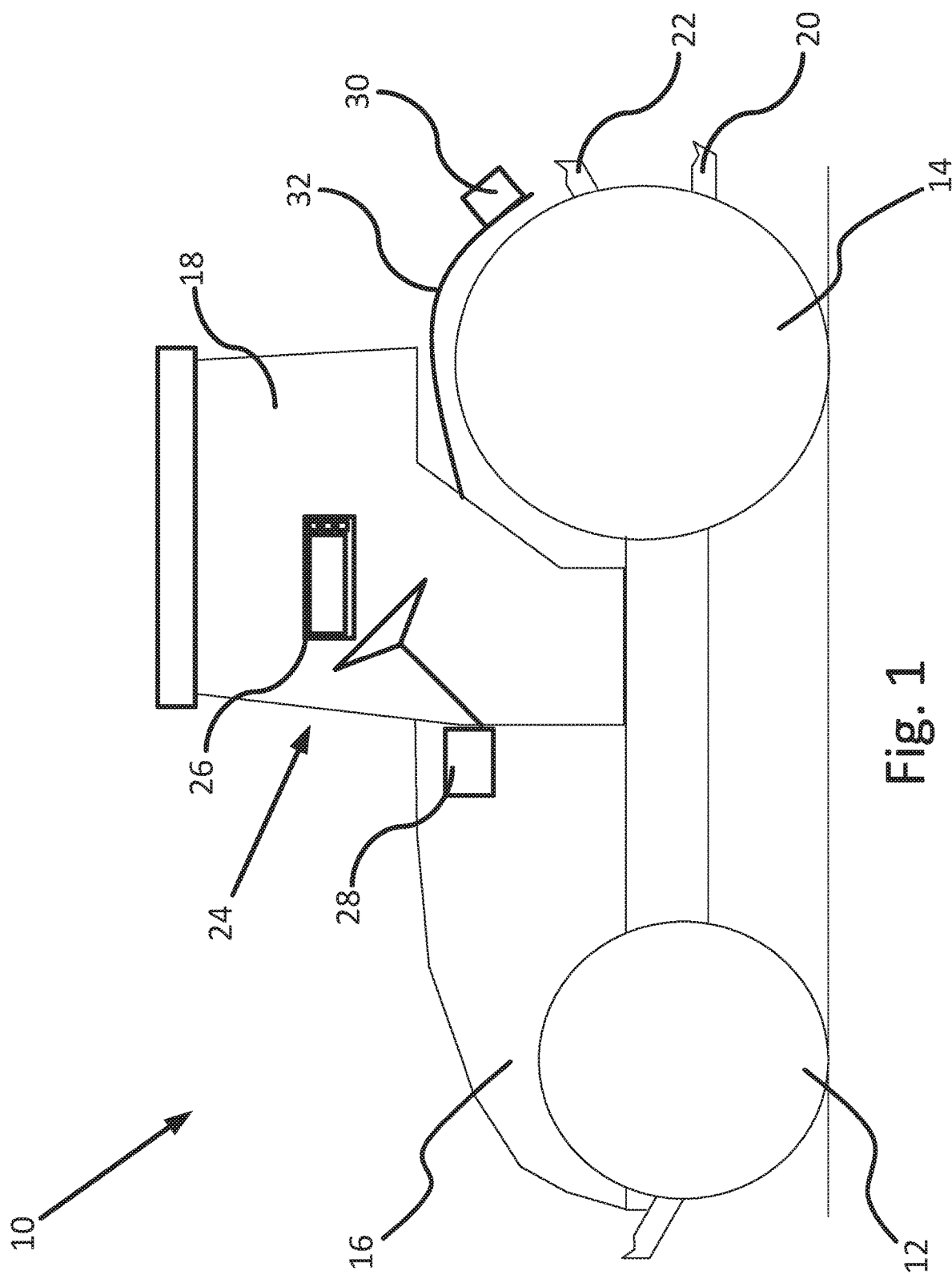
FIG. 1 is a side view of an agricultural tractor having a lifting block according to the invention.

With reference to FIG. 1, an agricultural vehicle according to the invention in the form of an agricultural tractor is indicated at 10. The tractor 10 comprises front wheels 12 and rear wheels 14, a forward engine compartment 16 and a cab section 18. The tractor 10 is provided with a rear attachment system 20 which can be used to couple the tractor with a suitable coupling portion of a towed implement or trailer (not shown), so that the implement can be towed by the tractor 10. The rear attachment system 20 can be any suitable connection system such as a drawbar having a hitch hook, a hitch pin, a ball hitch, etc. The tractor 10 is further provided with a rear three-point linkage partly indicated at 22, which can be used for the mounting of suitable three-point linkage implements to the tractor 10. It will be understood that the invention is primarily intended for use on relatively large tractors, e.g. tractors having relatively high horsepower, e.g. above 200 HP, preferably above 300 HP.

Within the cab 18, an operator station 24 is provided, where the operator can access operator controls including an operator terminal 26. The tractor 10 is provided with at least one electronic control unit (ECU) 28. The ECU 24 is configured to interface with the operator controls 22 and with the various systems and sensors provided about the tractor 10, to provide for monitoring and control of tractor operation. The operator controls 26 and ECU 28 allow the operator to actuate different elements of the tractor 10, e.g. hydraulic circuits, lifting systems, HVAC operation, and/or to control the acceleration and steering of the tractor 10.

It will be understood that the ECU 24 may be provided as a single processing device capable of performing a variety of commands relating to the control of the tractor, or the ECU 24 may be provided as a plurality of different controllers, e.g. a steering controller coupled with the steering system of the tractor, a display controller coupled with the operator terminal 22, etc. The tractor 10 is further provided with additional external operator controls 30 located at the rear of the tractor 10, which can allow for the control of tractor components when an operator is outside of the cab 18. In FIG. 1, the external controls 30 are illustrated as mounted on a rear fender 32 of the tractor 10, but it will be understood that other locations for the controls 30 may be provided.

Figure 2:
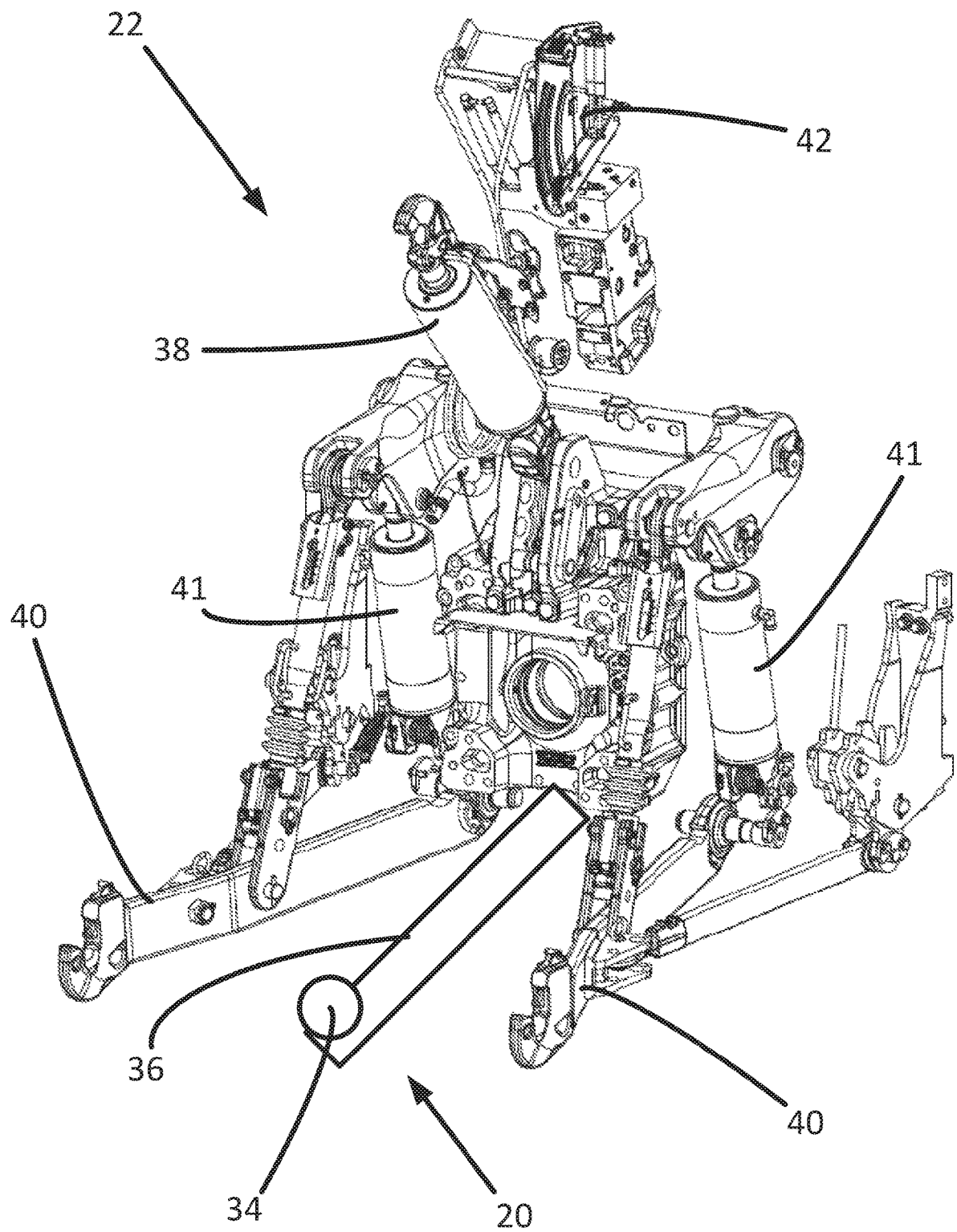
FIG. 2 is a perspective view of a rear linkage of the tractor of FIG. 1 having a lifting block.

FIG. 2 provides an enlarged view of the rear section of the tractor 10, showing the rear attachment system 20 and rear three-point linkage 22 in more detail.

The rear attachment system 20 is illustratively indicated by way of a ball hitch 34 provided on a drawbar 36 extending from the rear of the tractor 10. The ball hitch 34 is used to couple with a corresponding coupling portion (not shown) of a trailer or towed implement to be attached with the tractor 10. The rear attachment system may comprise any alternative connection system, e.g. a hitch hook, a hitch pin, a drawbar system, etc.

As will be generally understood, the rear three-point linkage 22 comprises a top link 38 and a pair of bottom links 40 arranged as the lift arms of the three-point linkage 22. In the case of relatively large tractors, e.g. having power ratings of above 200-300 HP, the rear linkages 22 of such tractors can be of considerable dimensions. While the bottom lift links 40 are manipulated using respective lifting cylinders 41, the top link 38 is provided unpowered and unsupported, and can easily be a weight of the order of 30-50 kgs which can require manual manipulation by an operator. It will be understood that the system of the invention is preferably used on tractors having top links weighing at least 20-25 kgs.

The tractor 10 further comprises a lifting block 42 arranged at the rear of the tractor 10, adjacent the rear attachment system 20 and three-point linkage 22. The lifting block 42 is shown in more detail in the cross-sectional views of FIGS. 3 & 4.

Figure 3:
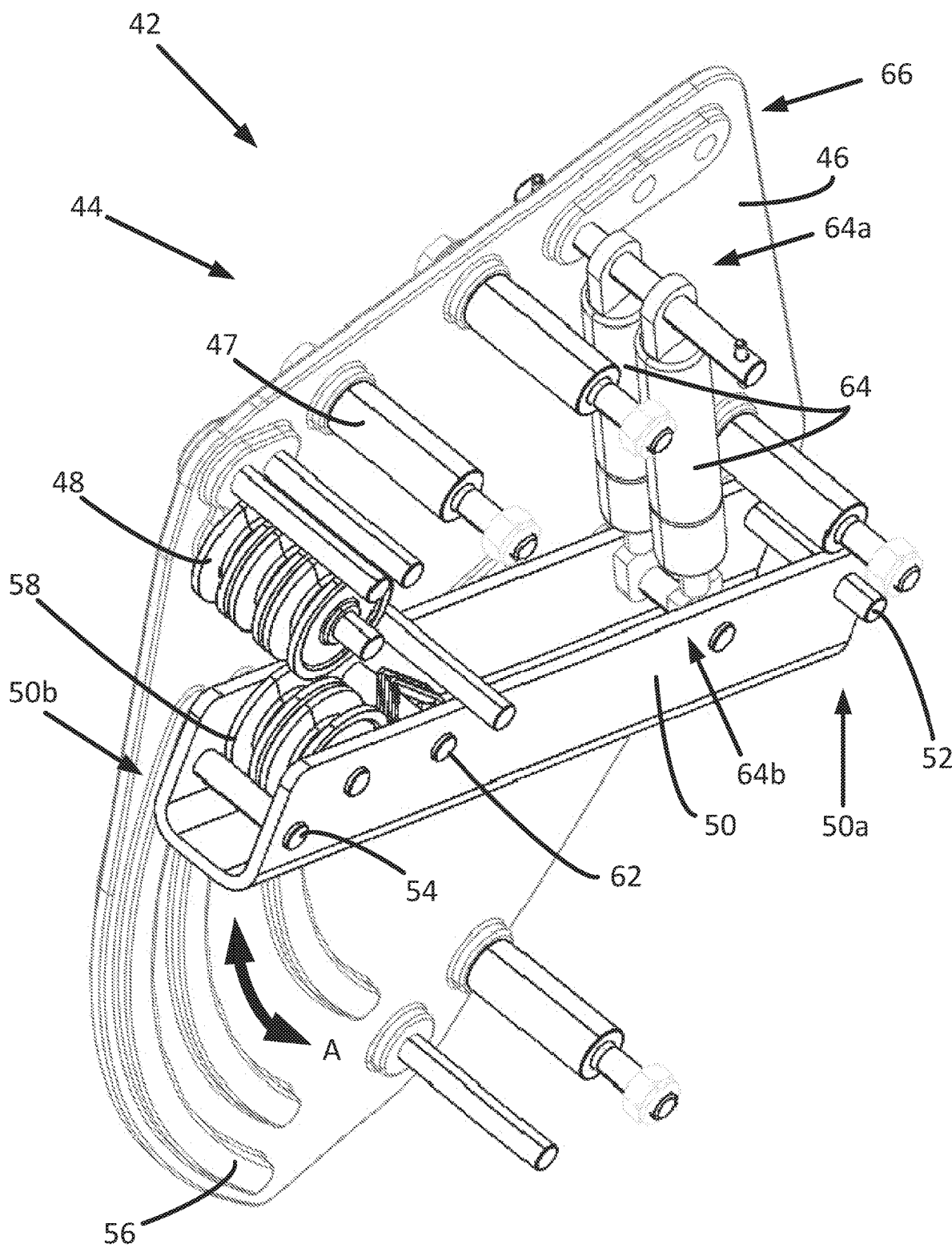
FIG. 3 is a perspective view of the having a lifting block of FIG. 2.
Figure 4:
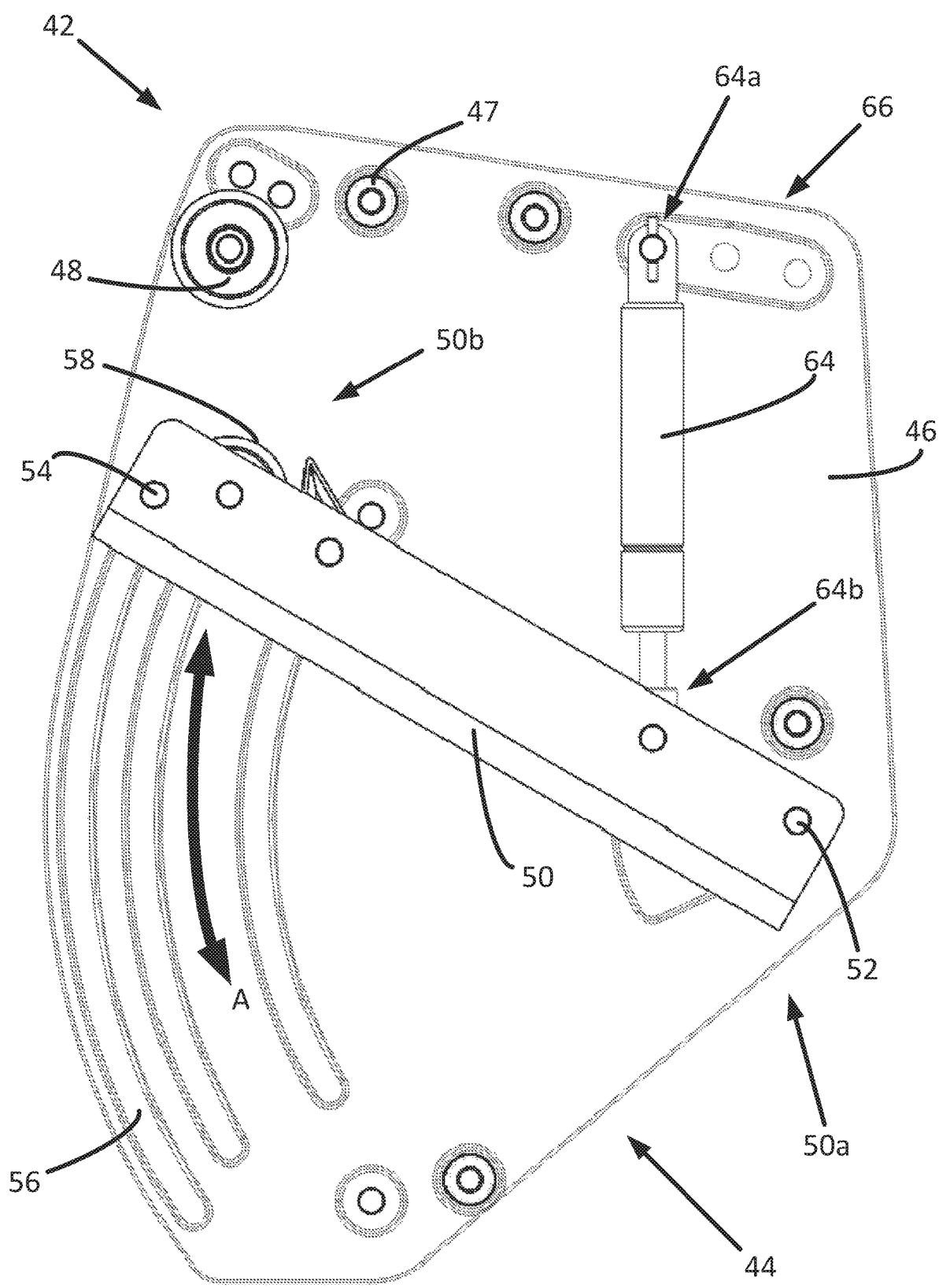
FIG. 4 is a cross-sectional plan view of the lifting block of FIG. 2.

The lifting block 42 comprises a housing indicated at 44 provided by a pair of opposed mounting plates 46 (only one of which is shown in FIGS. 3 & 4). The mounting plates 46 can be coupled together to form the housing 44 using an appropriate array of stringers or crossbars or bolts, one of which is indicated at 47.

The mounting plates 46 are provided on either side of a first winding pulley 48, about which a cable can be wound. The lifting block 42 further comprises an adjustment arm 50 having a first end 50a pivotally mounted to the housing 44 about a pivot point 52, the arm 50 having a second end 50b, the arm 50 positioned between the opposed mounting plates 46.

The second end 50b of the arm 50 is provided with a projecting element 54 which can be received in a complimentary channel 56 defined in at least one of the mounting plates 46, to allow for the second end 50b of the arm 50 to travel along an arc A as the arm 50 rotates about the pivot point 52. It will be understood that the projecting element 54 may be provided on one or on two opposite sides of the arm 50, with corresponding channels 56 defined in the adjacent mounting plates 46. The channels 56 can act to restrict the movement of the arm 50 to within a defined arc.

A second winding pulley 58 is carried on the arm 50, towards the second end 50b of the arm 50. In the illustrated embodiment, the arm 50 is provided as a beam defining an open channel to receive the second winding pulley 58, but it will be understood that other suitable arm constructions may be used.

Figure 5:
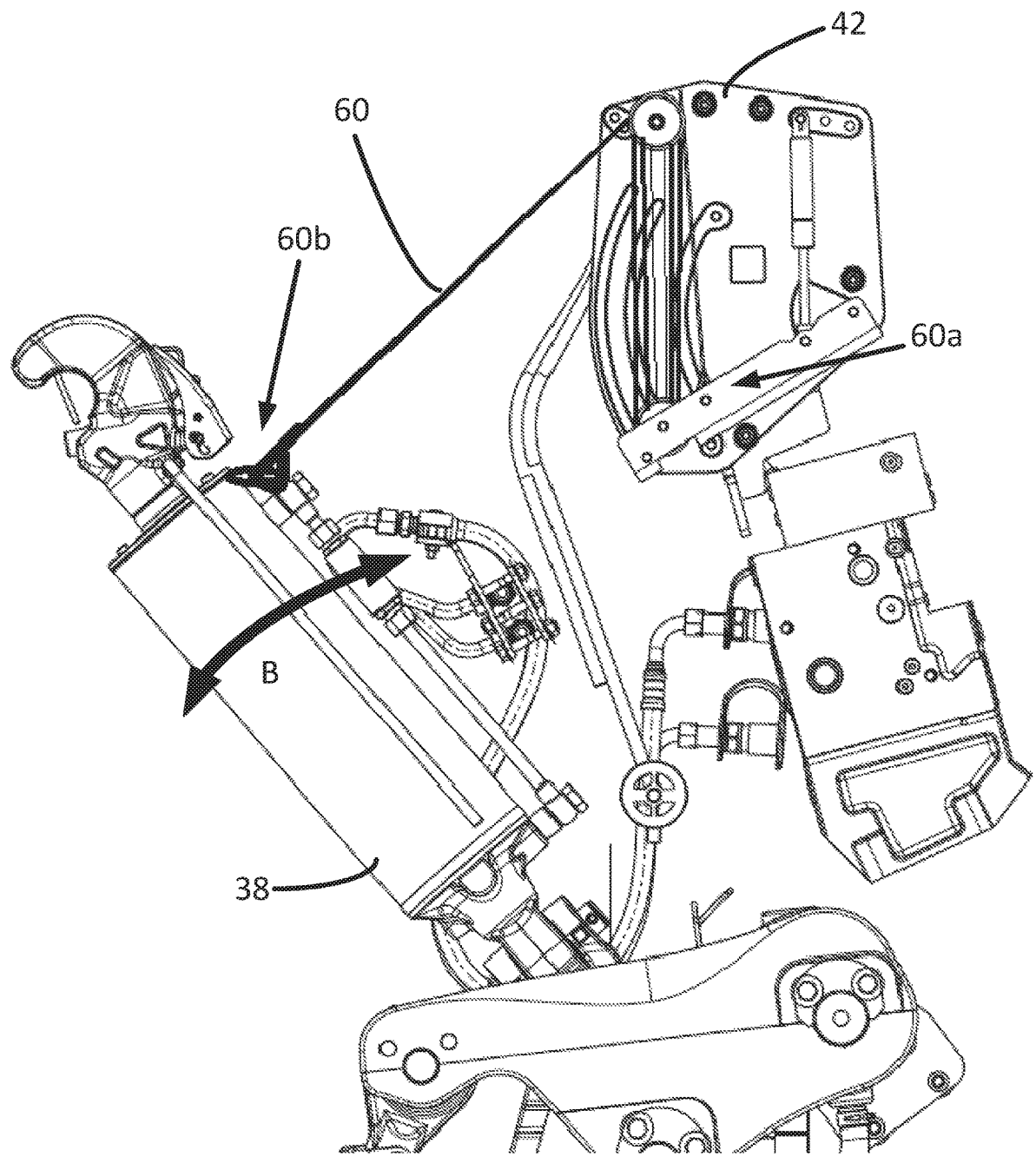
FIG. 5 is a side plan view of the rear linkage of FIG. 2 illustrating the use of the lifting block.

With further reference to FIG. 5, a cable 60 is provided as part of the lifting block 42, which has a first end 60a which is attached to a pin 62 carried on the arm 50 of the lifting block 42. The cable 60 is wound about both the first pulley 48 and the second pulley 58 multiple times, such that a relatively long length of cable 60 can be held between the two pulleys 48,58. The cable 60 provides a free second end 60b (FIG. 5) which can be used to attach to components (as described below). The cable 60 may be provided as any suitable chord, rope, chain, or wire, etc.

As the second end 50b of the arm 50 is moved within the housing 44, the relative distance between the two pulleys 48,58 can be varied. As a result, the length of cable 60 which is stored between the two pulleys 48,58 can be adjusted, from a relatively short length when the second end 50b of the arm 50 is closely adjacent to the first pulley 48 as shown in FIGS. 3 & 4, to a relatively long length when the second end 50b of the arm 50 is moved away from the first pulley 48 as shown in FIG. 5.

By varying the distance between the pulleys 48,58, a greater portion of the cable 60 is held taut between the pulleys 48,58, leaving less slack along the cable 60 and accordingly less cable length which can drawn outside of the lifting block 42. Accordingly, the length of the cable 60 which can be drawn out from the lifting block 42 can be adjusted based on the movement of the arm 50.

The lifting block 42 further comprises at least one actuator 64. In the illustrated embodiment, two actuators 64 are shown, but it will be understood that any number of suitable actuators 64 may be used. The actuators 64 have a first end 64a which is pivotally attached to the mounting plates 46 of the housing 44, and a second end 64b which is pivotally attached to the arm 50. The actuators 64 can be operated to control the rotation of the arm 50 about the pivot point 52. It will be understood that multiple attachment points 66 may be provided for the actuators 64 on the mounting plates 46, and/or on the arm 50, to allow for different ranges of movement of the actuators 64 when adjusting the arm position.

By appropriate control of the actuators 64, the arm 50 can be moved to adjust the distance between the pulleys 48,58, and correspondingly the length of the cable 60 which can be provided outside of the lifting block 42. As a result, controlling the actuators 64 will result in a lifting force provided at the free second end 60b of the cable 60, which can aid in the lifting and manipulation of components. With reference to FIG. 5, the second end 60b of the cable 60 is preferably releasable attachable with the top link 38 of the three-point linkage 22. The second end 60b of the cable 60 may be provided with a hook or other suitable connector which can couple with a complementary connector or projection provided on the top link 38, or the second end 60b of the cable 60 can simply be looped about the top link 38.

As a result of the releasable connection of the second end 60b of the cable 60 with the top link 38, the lifting block 42 can be used to assist in the raising and lowering of the top link 38 of the three-point hitch 22. This can provide considerable assistance to a tractor operator, as a major part of, if not all of, the weight of the top link 38 can be supported by the cable 60. By appropriate control of the actuators 64 and the relative distance between the pulleys 48,58, the top link 38 can be raised or lowered as indicated by arrow B.

In a further aspect, the lifting block 42 can be configured to retain the top link 38 in a raised storage position, when the top link 38 is not in use. As a result, the lifting block 42 acts to hold the unused top link 38 in a position where the top link 38 does not obstruct any operations involving the rear of the tractor 10.

In addition, the second end 60b of the cable 60 can be selectively attached to a coupling portion of an implement to be attached to the tractor 10, such that the cable 60 can be used to raise or lower the implement coupling portion to attach with the rear attachment system 20 of the tractor 10.

The actuators 64 can be provided as any suitable linear actuator device, e.g. a pneumatic actuator, a hydraulic actuator, an electromechanical actuator. In a particularly preferred embodiment, the actuators 64 are configured as spring-return actuators, which are biased to force the pulleys 48,58 to a position where the cable 60 is retracted within the housing 44 of the lifting block 42. As a result, the cable 60 will be safely stored when not in use.

The actuators 64 can be coupled with a suitable pneumatic, hydraulic or electrical circuit of the tractor 10, such that the operation of the lifting block 42 may be controlled by the operator, for example using the operator controls 22 and/or the rear operator controls 30. The actuators 64 may be selectively coupled with such circuits as required, to allow for maximum flexibility of use of the system.

The lifting block 42 may be provided as an integral component of the tractor 10, or may be provided as a separate component for installation or retrofitting to an existing tractor 10, wherein the lifting block 42 is attached to a portion of the structure of the tractor 10 by mounting at least one of the mounting plates 46 to the tractor 10. Both of the mounting plates 46 may be provided with bolt holes as appropriate, to allow the position or orientation of the lifting block 42 on the tractor 10 to be easily varied by the operator. It will be understood that the lifting block 42 may be provided as a kit of parts as appropriate for a retrofitting operation.

An agricultural tractor 10 having a dedicated lifting block 42 located adjacent the three-point hitch 22 of the tractor 10 allows for improved ease of manipulation of the relatively heavy components of the hitch, as well as improved ease of coupling the tractor 10 with towed implements or trailers. The lifting block 42 provides considerable advantages for operators of relatively large-scale agricultural tractors, due to the increased weight of associated tractor components and implements.

The invention is not limited to the embodiments described herein, and may be modified or adapted without departing from the scope of the present invention.

The invention claimed is:

1. An agricultural tractor comprising a three-point hitch with a top link, the tractor further comprising a lifting block provided adjacent the three-point hitch to allow the top link to be raised or lowered relative to the rear attachment system, wherein the lifting block comprises:
   a retractable cable to be selectively attached to the top link;
   at least two pulleys, a portion of the cable running between the at least two pulleys; and
   at least one actuator, said at least one actuator configured to control retraction of the cable to allow for raising or lowering of the top link and said at least one actuator arranged to adjust a distance between said pulleys, to control the length that the cable can extend outside the pulleys.

2. The tractor of claim 1, wherein the lifting block is configured to retain the top link in a raised storage position, when the top link is not in use.

3. The tractor of claim 1, wherein the tractor comprises a rear attachment system, the rear attachment system for connection with a coupling portion of an implement to be attached to the tractor, wherein the retractable cable of the lifting block is arranged to be selectively attached to such an implement coupling portion, to allow for the raising or lowering of the implement coupling portion relative to the rear attachment system of the tractor.

4. The tractor of claim 1, wherein at least one of the pulleys comprises a winding pulley or a winding sheave.

5. The tractor of claim 1, wherein the lifting block comprises a housing, wherein the pulleys are provided within the housing, and wherein the at least one actuator is arranged to adjust a distance between said pulleys to control the length that the cable can extend outside the housing.

6. The tractor of claim 5, wherein the lifting block comprises:
   a first pulley mounted on said housing; and
   a second pulley mounted on an adjustment arm located in the housing,
   wherein a first end of the adjustment arm is pivotably mounted on said housing, so that an opposite second end of the adjustment arm is moveable through an arc as the arm is pivoted, the second pulley located towards the second end of the adjustment arm.

7. The tractor of claim 6, wherein the housing comprises a pair of opposed mounting plates arranged either side of the adjustment arm.

8. The tractor of claim 7, wherein the lifting block is secured to the tractor by mounting either of the opposed mounting plates to a portion of the tractor.

9. The tractor of claim 7, wherein bolt holes are provided on the mounting plates to secure either of the mounting plates to the tractor.

10. The tractor of claim 6, wherein the at least one actuator is coupled with the adjustment arm, to control the pivoting of the adjustment arm about a pivot point.

11. The tractor of claim 6, wherein the at least one actuator comprises a first end connected to the lifting block housing and a second end connected to the adjustment arm.

12. The tractor of claim 1, wherein the at least one actuator comprises a spring-return actuator.

13. The tractor of claim 5, wherein the at least one actuator comprises a spring-return actuator arranged to bias the cable to a retracted state wherein the cable is substantially retained within the lifting block housing.

14. The tractor of claim 1, wherein the at least one actuator comprises at least one of the following: a pneumatic actuator, a hydraulic actuator, an electromechanical actuator.

* * * * *